Oct. 23, 1923.
H. J. D. ROBINSON
1,471,707
DEMOUNTABLE RIM FOR AUTOMOBILE WHEELS
Filed April 10, 1922
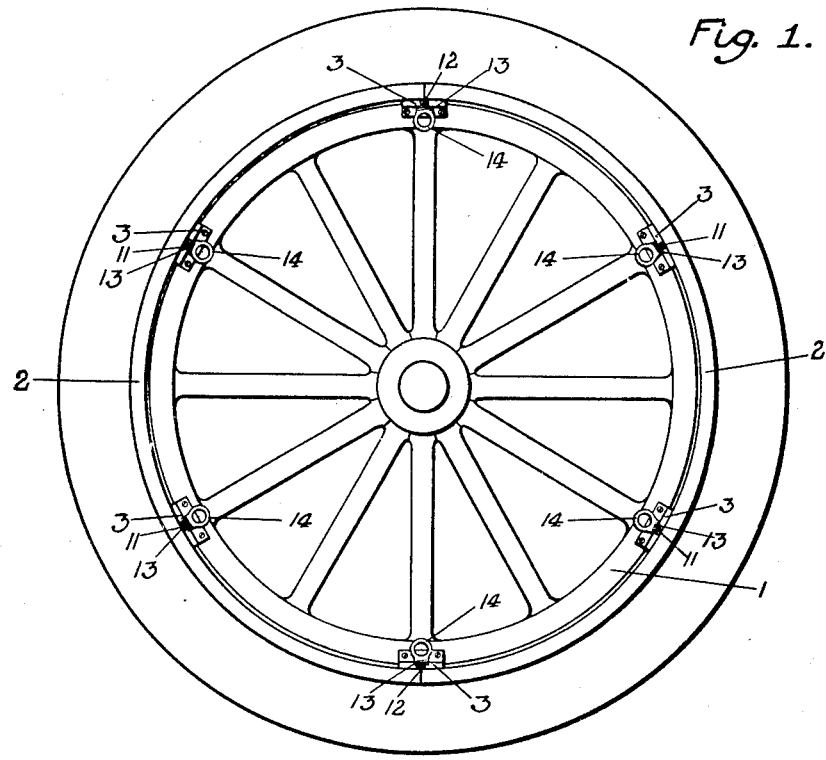
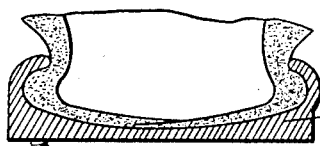
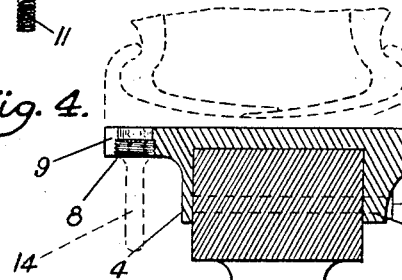
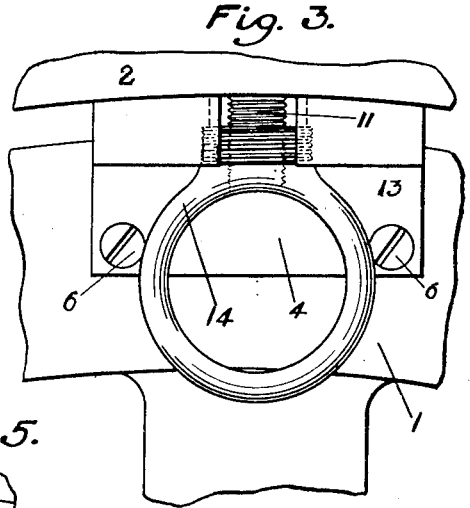
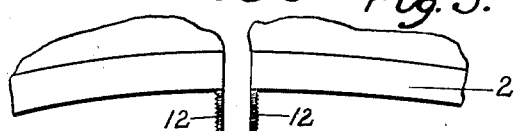
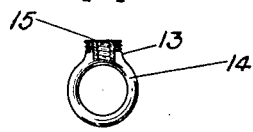
INVENTOR
H.J.D. Robinson.
By Fetherstonhaugh Co.
Attys.

Patented Oct. 23, 1923.

1,471,707

UNITED STATES PATENT OFFICE.

HARVEY JOHN DONALDSON ROBINSON, OF TROCHU, ALBERTA, CANADA.

DEMOUNTABLE RIM FOR AUTOMOBILE WHEELS.

Application filed April 10, 1922. Serial No. 551,138.

*To all whom it may concern:*

Be it known that I, HARVEY JOHN DONALDSON ROBINSON, a resident of the village of Trochu, in the Province of Alberta, Canada, have invented certain new and useful Improvements in Demountable Rims for Automobile Wheels, of which the following is the specification.

My invention relates to improvements in demountable rims for automobile wheels and the object of the invention is to devise a tire carrying rim which can be readily and quickly detached from the felloe of the wheel without the use of special tools.

A further object is to devise a tire carrying rim in which the tire can be readily applied thereto and detached therefrom, and a still further object is to devise a tire carrying rim which will not be liable to become rust-bound, as it is held away from contact with the felloe.

My invention consists of a demountable rim constructed and arranged all as hereinafter more particularly described and illustrated in the accompanying drawing in which:

Fig. 1 represents a front elevation of a wheel of an automobile showing a rim constructed according to my invention applied thereto and the means of applying the same to the wheel.

Fig. 2 is a cross sectional view of the rim and part of the tire.

Fig. 3 is a section of the felloe of the wheel showing one of the rim carrying blocks attached thereto and a portion of the rim.

Fig. 4 is a sectional view through one of my blocks showing the rim in dotted lines, and Fig. 5 is an elevational view of the adjacent ends of the divided rim showing the means for sealing them together.

Like characters of reference indicate corresponding parts in the different views.

1 is the felloe of the wheel. 2, 2 are the opposed sections of the tire carrying rim being constructed with beads adapted to carry either the ordinary clincher tire or straight walled tire as the case may be.

3, 3 are the rim carrying blocks provided with inwardly extending spaced apart flanges 4 and 5, said blocks adapted to straddle the felloe and to be secured thereto by means of the rivets or bolts 6 extending through the felloe and flanges 4 and 5.

7 is a lateral flange provided on the inner side of the outer face of the block, said outer face of the block being preferably convexed laterally to correspond with the curvature of the inner face of the tire carrying rim to which it is applied. Each block is provided with an outwardly extending lateral flange 8 provided with an inwardly extending slot 9 communicating with an orifice 10 extending through the flange, said orifice being threaded for a portion of its length from its inner end.

11, 11 are inwardly extending radially disposed studs provided on the rim 2. The end studs 12 of each section of the rim are semicircular in cross section and threaded on their faces so that when the adjacent ends of the rim sections are applied to one another, such end studs 12 will constitute a complete threaded stud.

13, 13 are nuts having rings 14 formed thereon, said nuts being threaded externally and also provided with threaded orifices 15 extending therethrough, said studs 11 and 12 adapted to be threaded into such threaded orifices in the nuts 13 and said external threads on the nuts threaded into the threaded portion of the orifice 10.

In applying the tire 16 to my tire carrying rim I apply one section of the rim to the tire and then apply the other section. I then thread the nuts 13 onto the adjacent studs 12, thus securing the sections together.

Where it is desired to carry the tire and rim as a spare, the nuts 13 will be screwed down onto the adjacent studs 12 to their limit.

When it is desired to apply the tire carrying rim to the wheel it is merely necessary to slacken the nuts 13 on the studs 12 and to apply the tire carrying rim to the blocks 3 so that the studs 11 and 12 register with the slots 9 in the flanges 8. The rim can now be pushed home onto the blocks until its inner face engages the flange 7. The nuts 13 are applied to the remaining studs 11 and screwed down until the exteriorly threaded portion of the nuts are threaded home into the threaded portion of the orifices 10. In order to tighten the nuts in position the handle of a screw driver or any other suitable tool may be inserted into the ring 14.

To remove the rim it is merely necessary to unscrew the nuts off the studs and to pull the rim from the blocks.

It will be noted that the studs 11 and 12 being inserted into the orifices 10 in the blocks prevent any creeping of the rim relatively to the felloe.

From the above description it will be seen that I have devised a simple and effective demountable rim which will be simple in construction and which can be readily applied to and detached from the wheels of automobiles. In addition, I have devised a rim which can be readily collapsed to facilitate the tire being attached to or removed therefrom.

What I claim as my invention is:

1. In automobile demountable rims, the combination with the felloe, of a tire carrying rim, inwardly extending studs on the rim, rim carrying blocks fixedly secured to the felloe, each of said blocks having an outwardly extending flange with an inwardly extending slot communicating with an orifice, and means for retaining the studs in the orifices upon the tire carrying rim being applied to the blocks.

2. In automobile demountable rims, the combination with the felloe, of a tire carrying rim, inwardly extending studs on the rim, rim carrying blocks fixedly secured to the felloe, each of said blocks having an outwardly extending flange with an inwardly extending slot communicating with a threaded orifice, and externally and internally threaded nuts threaded into the orifice and onto the studs threaded thereinto.

3. In automobile demountable rims, the combination with the felloe, of a tire carrying rim, inwardly extending studs on the rim, outwardly extending rim carrying blocks fixedly secured to the felloe, each of said blocks having a lateral flange on the inner side of its rim engaging face and an outwardly extending flange having an inwardly extending slot communicating with an orifice, and means for retaining the studs in the orifices upon the tire carrying rim being applied to the blocks.

4. In automobile demountable rims, the combination with the felloe, of a tire carrying rim, inwardly extending studs on the rim, rim carrying blocks fixedly secured to the felloe, each of said blocks having a lateral flange on the inner side of its rim engaging face and an outwardly extending flange having an inwardly extending slot communicating with a threaded orifice and externally and internally threaded nuts threaded into the orifice and on the studs inserted thereinto.

5. In automobile demountable rims, the combination with the felloe, of a tire carrying rim divided into a plurality of sections, inwardly extending longitudinally divided threaded studs, the halves of each stud secured to the adjacent ends of the rim sections and nuts threaded on the divided studs for securing them together, tire carrying blocks fixedly secured to the felloe, each of said blocks having a lateral flange on the the inner side of its rim engaging face and an outwardly extending flange having an inwardly extending slot communicating with a threaded orifice and externally and internally threaded nuts threaded into the orifice and on the studs inserted thereinto.

HARVEY JOHN DONALDSON ROBINSON.